Figure 1:
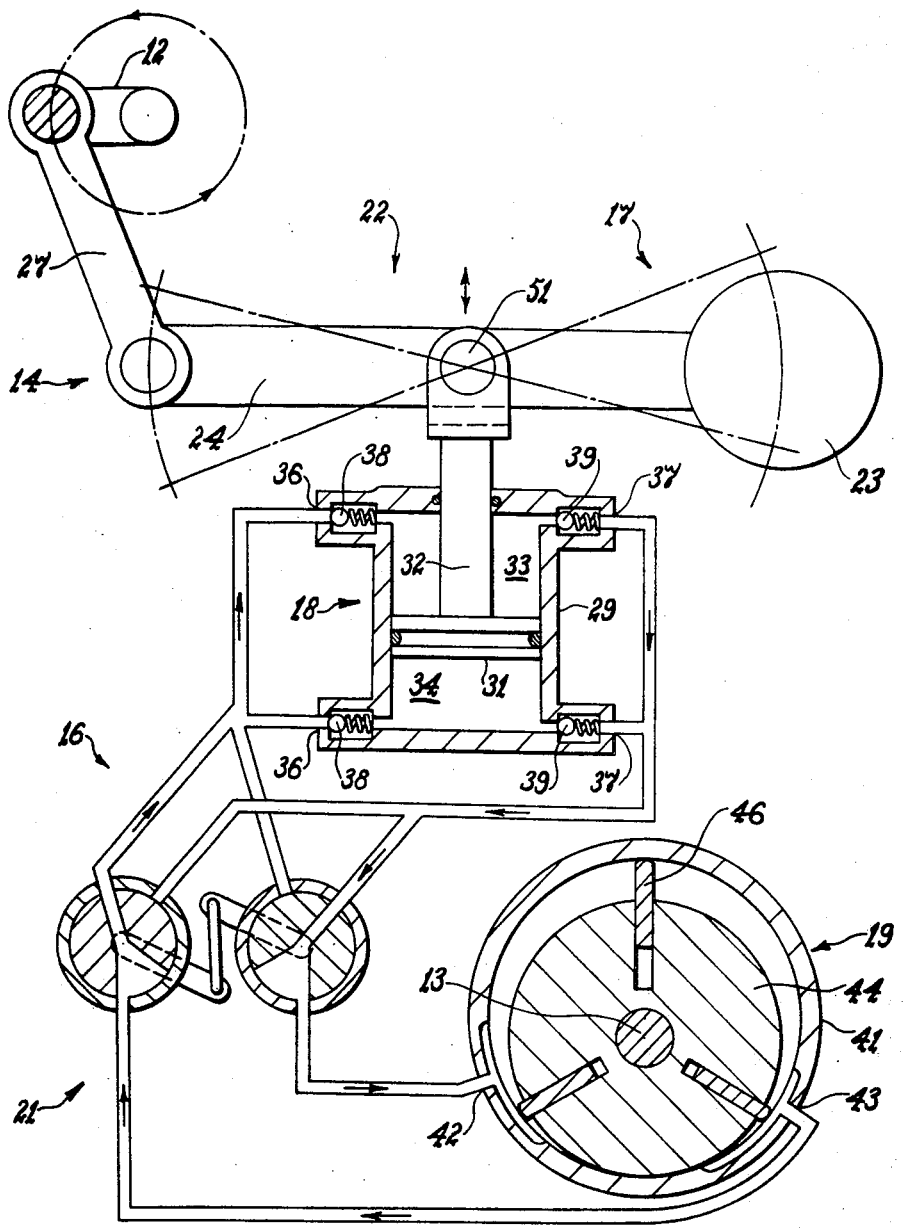

United States Patent

Esperson

[15] 3,688,499
[45] Sept. 5, 1972

[54] INERTIAL POWER TRANSMISSIONS
[72] Inventor: James Ronald Esperson, Vermont, Victoria, Australia
[73] Assignee: General Motors Corporation, Detroit, Mich.
[22] Filed: Oct. 1, 1970
[21] Appl. No.: 77,211

[30] Foreign Application Priority Data
Oct. 3, 1969 Australia..................61853/69

[52] U.S. Cl......................60/53 C, 60/52 HF, 74/45, 74/47, 417/211
[51] Int. Cl..............................................F16d 31/02
[58] Field of Search.........60/52 HF, 53 C; 74/45, 47; 417/211

[56] References Cited
UNITED STATES PATENTS
376,383   1/1888   Higginson.................60/52 HF
2,719,512  10/1955  Kovach......................60/53 C Primary Examiner—Edgar W. Geoghegan
Assistant Examiner—Allen M. Ostrager
Attorney—W. E. Finken, A. M. Heiter and D. F. Scherer

[57] ABSTRACT

This invention relates to an automatic inertial power transmission for motor vehicles and other machines including a driving apparatus and a driven apparatus. The automatic power transmission is operatively connectable between the driving apparatus and the driven apparatus to transmit power supplied from the driving apparatus at an input torque to the driven apparatus at an output torque. The automatic power transmission includes a mechanical transmission section operatively connected to an hydraulic transmission section. The mechanical transmission section includes an inertial modulating means operative to regulate the interaction between the mechanical and hydraulic transmission section to automatically vary the ratio of the output torque to the input torque according to the load encountered by the driving apparatus. The invention also relates to a machine including automatic power transmission.

14 Claims, 4 Drawing Figures

PATENTED SEP 5 1972　　3,688,499

SHEET 2 OF 3

INVENTOR
James Ronald Esperson
BY Donald F. Scherer
ATTORNEY

INERTIAL POWER TRANSMISSIONS

The present invention relates to automatic inertial power transmissions for transmitting power supplied from a driving apparatus at an input torque to a driven apparatus at an output torque and also to motor vehicles and other machines incorporating such power transmissions.

The invention is especially applicable to motor vehicles in which the driving apparatus is an internal combustion or other engine and the driven apparatus includes one or more ground engaging transport wheels. However, it is to be clearly understood that the invention is not limited to automatic inertial power transmissions for motor vehicles or to motor vehicles incorporating such power transmissions.

Inertial power transmissions have been proposed in which the components are entirely mechanical. However, such mechanical inertial power transmissions have suffered from several disadvantages including noisy operation, inefficiency, unreliability and relative complication and high cost in manufacture and maintenance.

The primary object of the present invention is to provide an improved inertial power transmission which, in operation, is automatically self-regulating to vary the ratio of the output torque to the input torque according to the load encountered by the driven apparatus.

Accordingly, the present invention provides an automatic inertial power transmission for transmitting power supplied from a driving apparatus at an input torque to a driven apparatus at an output torque. The driving apparatus may be an internal combustion or other engine with a crank or other shaft for supplying the power to the automatic inertial power transmission. The input torque supplied from the driving apparatus in use depends upon the operating conditions of the driving apparatus. In the case of a motor vehicle this will vary from time to time and hence the input torque will correspondingly vary from time to time. The output torque depends on the load encountered by the driven apparatus and in the case of a motor vehicle the condition and contour of the road or other surface on which the vehicle is driven will vary from time to time and there will be corresponding variation in the output torque.

The automatic inertial power transmission according to the invention is operatively connectable between the driving apparatus and the driven apparatus and includes an inertial transmission section and an hydraulic transmission section operatively connected to the inertial transmission section. The inertial and hydraulic transmission sections are preferably so arranged that the inertial transmission section is operatively connectable to the driving apparatus and the hydraulic transmission section is operatively connectable to the driven apparatus.

The inertial transmission section according to the invention includes an inertial modulating means which, in use, is operative to regulate the interaction between the inertial and hydraulic transmission sections to automatically vary the ratio of the output torque to the input torque according to the load encountered by the driven apparatus.

The present invention also provides a motor vehicle or other machine including: driving apparatus, driven apparatus, and an automatic inertial power transmission as previously defined herein according to the invention and operatively connecting the driven apparatus to the driving apparatus for transmitting power supplied from the driving apparatus to the driven apparatus.

The description of the invention that follows refers to the features already defined and further optional features in more detail. To facilitate understanding of this more detailed description reference is made to the accompanying drawings where the features are illustrated in preferred form. It is to be understood however, that the essential and optional features of the invention described are not limited to the specific forms of these features as shown in the drawings.

Figure 2:
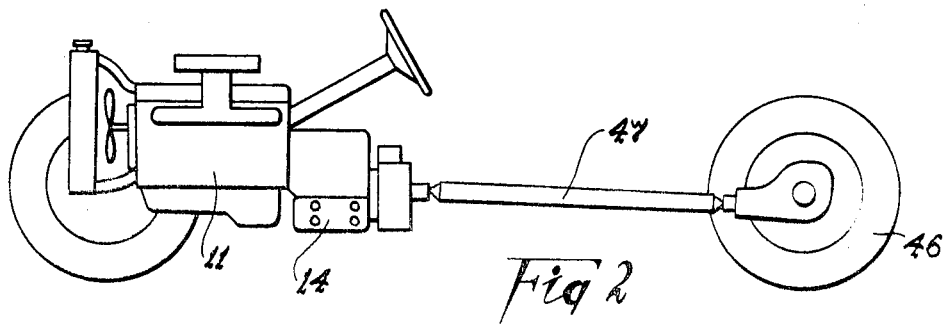
Figure 3:
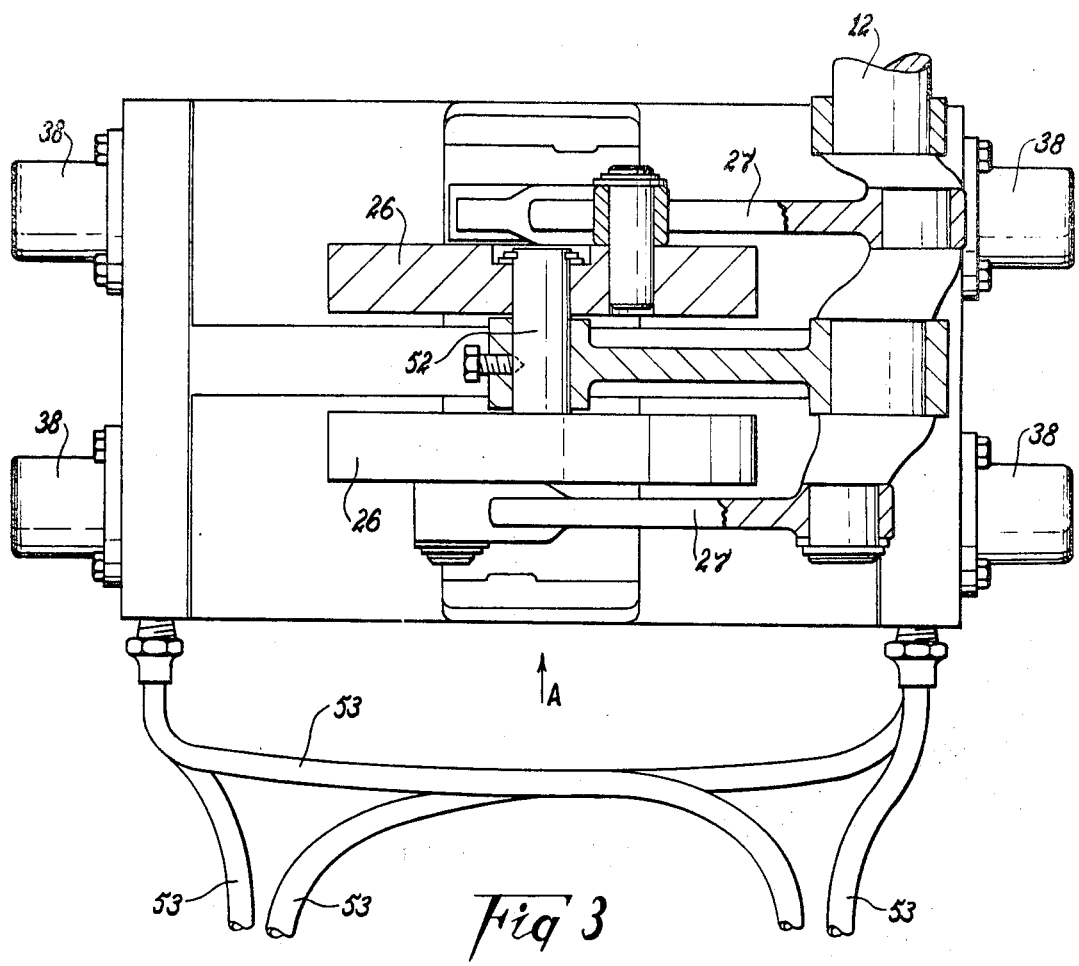
Figure 4:
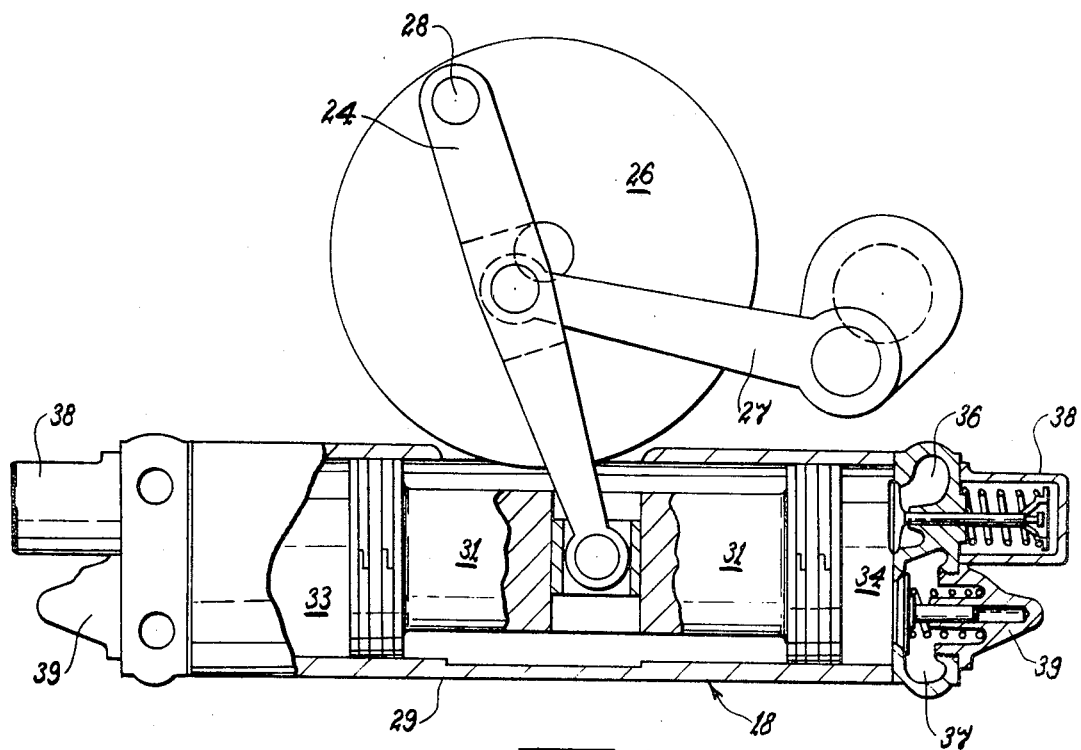

Referring to the drawings:

FIG. 1 is a schematic representation of one form of automatic inertial power transmission according to the invention, FIG. 2 is a schematic representation of a motor vehicle incorporating an automatic inertial power transmission according to the invention, FIG. 3 is a view of part of another form of inertial power transmission according to the invention and showing an assembly of two oscillatable fly wheels coupled to a pair of double acting hydraulic pumps; and FIG. 4 is a view of the power transmission shown in FIG. 3, taken in the direction of "arrow A" shown on FIG. 3 and with the coupling hoses at the bottom of FIG. 3 omitted, certain parts broken away and sectioned for clarity and the rear fly wheel and associated parts also omitted for further clarity.

In the initial part of this detailed description it is proposed to refer mainly to the power transmission shown schematically in FIG. 1 and to refer later in more detail to the remaining FIGS. 2 to 4. However, because FIG. 1 shows only a schematic representation of the power transmission and only shows a very minor part of the driving apparatus and omits the driven apparatus entirely it may be convenient from time to time to refer to the other drawings.

An automatic inertial power transmission according to the invention is adapted for transmitting power supplied from a driving apparatus at an input torque to a driven apparatus at an output torque. The driving apparatus may be an engine 11, (See FIG. 2) and FIG. 1 shows a crankshaft 12 being the output shaft of such an engine 11. The power transmission is operatively connectable between the driving apparatus and the driven apparatus. The driven apparatus is not shown in FIG. 1, but is connectable to the output shaft 13 of the hydraulic motor shown in FIG. 1.

The power transmission according to the invention includes an inertial transmission section 14 and an hydraulic transmission section 16. The hydraulic transmission section 16 is operatively connected to the inertial transmission section 14 so that, in use, there is a driving relationship between the two transmission sections. The inertial transmission section 14 includes an inertial modulating means 17. In use, the inertial modulating means 17 operates to regulate the interaction between the inertial and hydraulic transmission sections in such a manner as to automatically vary the ratio of the output torque to the input torque according to the load encountered by the driven apparatus.

The inertial transmission section 14 is preferably operatively connectable to the driving apparatus and with this arrangement the hydraulic transmission section 16 is operatively connectable to the driven apparatus. It will be appreciated that with this arrangement the inertial transmission section 14 is adapted to drive the hydraulic transmission section 16.

The hydraulic transmission section 16 preferably includes hydraulic pumping means 18, an hydraulic motor 19 and an hydraulic fluid network 21 operatively connecting the pumping means 18 to the hydraulic motor 19. With this arrangement the inertial transmission section 14 is preferably operatively connected to the hydraulic pumping means 18 and the hydraulic motor 19 is operatively connectable to the driven apparatus. Thus, the inertial transmission section 14 is adapted, in use, to operate the hydraulic pumping means 18 to thereby send hydraulic fluid through the hydraulic fluid network 21 to operate the hydraulic motor 19 which in turn is adapted to operate the driven apparatus.

The inertial transmission section 14 preferably includes coupling means 22 operatively connectable to the driving apparatus and the inertial modulating means 17 preferably includes an inertial mass 23. With this arrangement the coupling means 22 may be operatively connected to the hydraulic pumping means 18 and to the inertial mass 23 so that, in use, the driving apparatus is adapted to operate the hydraulic pumping means 18 and the inertial mass 23.

The coupling means 22 may include a coupling lever 24 and the inertial mass 23 preferably includes a fly wheel 26 mounted for oscillation about its axis as shown in FIG. 4. The coupling lever 24 is operatively connected to the fly wheel 26 and to the hydraulic pumping means 18 and is itself operatively connectable to the driving apparatus. Thus, in use, the coupling lever 24 is adapted to oscillate the fly wheel 26 and also to operate the hydraulic pumping means 18.

In the example shown in FIG. 1 the coupling lever 24 is connected intermediate in its length to the hydraulic pumping means 18. One end of the coupling lever 24 is also connected to the inertial mass 23 and the other end of the coupling lever 24 is connected to the output shaft 12 of the driving apparatus. An alternative arrangement is shown in FIG. 4 where one end of the coupling lever 24 is connected to the fly wheel 26, the other end is connected to the hydraulic pumping means 18 and the driving apparatus is connected to the coupling lever intermediate in its length. In each instance the connection to the output shaft of the driving apparatus is through a connecting rod 27. In the case of FIG. 4 the connection of the coupling lever 24 to the fly wheel 26 is by means of a connecting pin 28.

The hydraulic pumping means 18 preferably includes a double acting hydraulic pump examples of which are shown in FIGS. 1 and 4. The double acting hydraulic pump may include a pump cylinder 29 and a pump piston 31. The pump piston 31 has a piston head reciprocable in the cylinder 29. The pump piston 31 is connected to the inertial transmission section 14. In the case of FIG. 1 this connection is through a piston rod 32 whereas in the case of FIG. 4 the coupling lever 24 is connected directly to the piston intermediate in its length.

The piston divides the cylinder into two compartments 33, 34. The size of these compartments varies during the operation of the double acting hydraulic pump. Each compartment has an inlet port 36 and an outlet port 37 and each inlet port 36 has a non-return valve 38 allowing for admission of hydraulic fluid into the cylinder 29, whereas each outlet port 37 has a non-return valve 39 allowing for emission of hydraulic fluid from the cylinder.

The hydraulic network 21 includes supply pipes extending from each outlet port 37 to the hydraulic motor 19 and from the hydraulic motor 19 to each inlet port 36.

The hydraulic motor 19 may include a motor casing 41 with an inlet/outlet port 42 and a separate outlet/inlet port 43 circumferentially spaced therefrom. The casing 41 houses a pump rotor 44 mounted on the rotor shaft 13. The rotor 44 may have a plurality of rotor vanes 46 and passage of hydraulic fluid through the casing 41 acts to rotate the rotor 44 and hence the rotor shaft 13. In this preferred arrangement the rotor shaft 13 is adapted to supply torque at the output torque to the driven apparatus.

As previously mentioned in this specification the invention also relates to a motor vehicle or other machine including driving apparatus, driven apparatus and an automatic inertial power transmission operatively connecting the driving and driven apparatus together. The driving apparatus is preferably an internal combustion or other engine with a crankshaft or other output shaft for supplying power at the desired input torque to the inertial power transmission. It will be appreciated that, in use, the input torque supplied by the driving apparatus depends on the nature and conditions of operation of the driving apparatus.

FIG. 2 shows a schematic representation of such a machine in the form of a motor vehicle. In this instance the driving apparatus is shown in the form of an engine 11 and the driven apparatus is in the form of the rear wheels 46, only one of which is shown in the drawing. The motor vehicle shown includes a power transmission according to the invention which replaces a conventional manual or automatic transmission. The vehicle engine 11 is adapted to drive the automatic transmission and the output of the automatic transmission is connected to the rear wheels through a conventional propeller shaft 47.

This is one of many alternative arrangements. In another arrangement the propeller shaft may be omitted and a separate hydraulic wheel motor provided in the or each driving wheel. The hydraulic network would be coupled to each wheel motor so that the output from the pumping means would drive the wheel motors.

In order to further clarify the understanding of the invention it is now proposed to describe the operation of the motor vehicle described in FIG. 2 incorporating an inertial power transmission of the kind described in relation to FIG. 1.

When the engine 11 is operating it rotates the output crankshaft 12 causing power to be supplied from the engine 11 to the inertial transmission section 14. This power is supplied through the connecting rod 27 to the coupling lever 24 which in turn supplies power to the inertial mass 23 and to the double acting hydraulic pump 18. If the vehicle brakes are applied to hold the rear wheels 46 stationary then the rotor 44 and rotor shaft 13 are also held stationary. This has the effect of preventing circulation of hydraulic fluid through the network 21 and the pump piston 31 is held stationary under hydraulic pressure. As a result pivotal connecting means 51 connecting the piston rod 32 to the coupling lever 24 is held stationary so that it acts as a fulcrum for the coupling lever 24 to cause the inertial mass 23 to oscillate with maximum amplitude. Hydraulic pressure in the hydraulic network 21 is then at a maximum for the given engine speed.

Assume now that the engine 11 is operating at a substantially constant speed, but sufficient to drive the vehicle when the brakes are released. Under these conditions when the brakes are released the hydraulic fluid is allowed to drive the rotor 44 of the hydraulic motor 19 and hence the rotor shaft 13. Accordingly torque is transmitted to the rotor shaft 13 and via the propeller shaft 47 to rotate the rear wheels 46.

As the vehicle and hence the rotor 44 accelerates, pressure in the hydraulic network 21 reduces permitting reciprocation of the pump piston 31 with progressively increasing stroke amplitude. This results in a corresponding progressive decrease in the amplitude of oscillation of the inertial mass 23 until a position of equilibrium is reached.

The load requirement of the rear wheels 46 determines the torque required at the rotor shaft 13. After an equilibrium position is reached any change in the load encountered by the driven apparatus will upset this equilibrium. For example, if the vehicle meets a hill demand for increased torque will cause the rotor 44 to decrease rotational speed and the double acting hydraulic pump 18 to reduce output by reducing the pump piston stroke, but at increased pressure resulting from increasing the amplitude of oscillation of the inertial mass 23. These compensating variations occur automatically until a new state of equilibrium is achieved.

A change in the equilibrium position can also be produced be increasing engine speed. If the speed of the engine 11 is increased the resulting increased torque input to the inertial transmission causes an increase in amplitude of oscillation of the inertial mass 23 with consequent increase of reaction forces at the fulcrum of the coupling lever 24 at the pivotal connecting means 51 and hence increased hydraulic pressure in the hydraulic network 21. Increase in the torque output at the rotor 44 results causing an increase in output torque to the rear wheels 46 and hence an increased vehicle speed until another state of equilibrium is reached.

Accordingly the ratio of the output torque to the input torque is automatically varied according to the load encountered by the vehicle.

Persons skilled in the art will appreciate that the embodiments described with reference to FIGS. 3 and 4 may be refined by such modifications as multiple crankshafts, multiple pumping means, multiple inertial modulating means and other variations.

FIGS. 3 and 4 illustrate one example of a modified arrangement. In this arrangement two fly wheels 26 are mounted in side by side relationship. Each fly wheel 26 is connected separately to the crankshaft 12. The arrangement is such that when the fly wheels oscillate they are opposite in phase.

Each fly wheel 26 has an associated coupling lever 24 and an associated double acting hydraulic pump 18. Each coupling lever 24 is connected to the crankshaft 12 and its associated fly wheel 26 and pump piston 31. If desired the two fly wheels 26 may be mounted on a common fly wheel mounting shaft 52. The coupling hoses 53 shown in FIG. 3 form part of the hydraulic fluid network for connection to the hydraulic motor 19. The pump pistons 31 are double headed and each pump cylinder 29 has inlet and outlet ports as previously described.

Having now described our invention, what we claim as new and desire to secure by Letters Patent is:

1. An automatic inertial power transmission for transmitting power supplied from a driving apparatus at an input torque to a driven apparatus at an output torque, said power transmission being operatively connectable between said driving and driven apparatus and including: an inertial transmission section and an hydraulic transmission section operatively connected to said inertial transmission section, said inertial transmission section including an inertial modulating means operative to regulate the interaction between said inertial and hydraulic transmission sections to automatically vary the ratio of said output torque to said input torque according to the load encountered by said driven apparatus.

2. An automatic inertial power transmission for transmitting power supplied from a driving apparatus at an input torque to a driven apparatus at an output torque, said power transmission including: an inertial transmission section operatively connectable to said driving apparatus and an hydraulic transmission section operatively connected to said inertial transmission section and operatively connectable to said driven apparatus; said inertial transmission section including an inertial modulating means operative to regulate the interaction between said inertial and hydraulic transmission sections to automatically vary the ratio of said output torque to said input torque according to the load encountered by said driven apparatus.

3. An automatic inertial power transmission as claimed in claim 2 wherein said hydraulic transmission section includes: hydraulic pumping means, an hydraulic motor and an hydraulic fluid network operatively connecting said hydraulic pumping means to said hydraulic motor; said inertial transmission section being operatively connected to said hydraulic pumping means and said hydraulic motor being operatively connectable to said driven apparatus.

4. An automatic inertial power transmission as claimed in claim 3 wherein said inertial transmission section includes coupling means operatively connectable to said driving apparatus, and said inertial modulating means includes an inertial mass, said coupling means being operatively connected to said hydraulic pumping means and to said inertial mass.

5. An automatic inertial power transmission as claimed in claim 4 wherein said coupling means includes a coupling lever and said inertial mass includes a fly wheel mounted for oscillation about its axis, said coupling lever being operatively connected to said fly wheel and to said hydraulic pumping means and also being operatively connectable to said driving apparatus.

6. An automatic inertial power transmission as claimed in claim 5 wherein said hydraulic pumping means includes a double acting hydraulic pump.

7. An automatic inertial power transmission as claimed in claim 6 wherein said hydraulic fluid network includes reversing valves whereby the flow of hydraulic fluid through said hydraulic motor from said hydraulic pump may be reversed so that said hydraulic motor may be rotated in forward or reverse direction as desired.

8. A machine including: driving apparatus, driven apparatus, and an automatic inertial power transmission operatively connecting said driven apparatus to said driving apparatus for transmitting power supplied from said driving apparatus at an input torque to said driven apparatus at an output torque; said power transmission including: an inertial transmission section and an hydraulic transmission section operatively connected to said inertial transmission section, said inertial transmission section including an inertial modulating means operative to regulate the interaction between said inertial and hydraulic transmission sections to automatically vary the ratio of said output torque to said input torque according to the load encountered by said driven apparatus.

9. A machine including: driving apparatus, driven apparatus, and an automatic inertial power transmission for transmitting power supplied from said driving apparatus at an input torque to said driven apparatus at an output torque, said power transmission including: an inertial transmission section operatively connected to said driving apparatus, an hydraulic transmission section operatively connected to said inertial transmission section and to said driven apparatus, said inertial transmission section including an inertial modulating means operative to regulate the interaction between said inertial and hydraulic transmission sections to automatically vary the ratio of said output torque to said input torque according to the load encountered by said driven apparatus.

10. A machine as claimed in claim 9, wherein said hydraulic transmission section includes: hydraulic pumping means, an hydraulic motor and an hydraulic fluid network operatively connecting said hydraulic pumping means to said hydraulic motor; said inertial transmission section being operatively connected to said hydraulic pumping means and said hydraulic motor being operatively connected to said driven apparatus.

11. A machine as claimed in claim 10, wherein said inertial transmission section includes coupling means operatively connected to said driving apparatus, and said inertial modulating means includes an inertial mass, said coupling means also being operatively connected to said hydraulic pumping means and to said inertial mass.

12. A machine as claimed in claim 11, wherein said coupling means includes a coupling lever and said inertial mass includes a fly wheel mounted for oscillation about its axis, said coupling lever being operatively connected to said fly wheel and to said hydraulic pumping means and also to said driving apparatus.

13. A machine as claimed in claim 12, wherein said hydraulic pumping means includes a double acting hydraulic pump.

14. A machine as claimed in claim 13, wherein said hydraulic fluid network includes reversing valves whereby the flow of hydraulic fluid through said hydraulic motor from said hydraulic pump may be reversed so that said hydraulic motor may be rotated in forward or reverse direction as desired.

* * * * *